United States Patent
Borghoff

(10) Patent No.: US 10,974,906 B2
(45) Date of Patent: Apr. 13, 2021

(54) ADJUSTABLE ANTI-TRAP GUARD FOR BELT CONVEYORS

(71) Applicant: BEUMER Group GmbH & Co. KG, Beckum (DE)

(72) Inventor: Nils Borghoff, Beckum (DE)

(73) Assignee: Beumer Group Gmbh & Co. Kg, Beckum (DE)

( * ) Notice: Subject to any disclaimer, the term of this patent is extended or adjusted under 35 U.S.C. 154(b) by 0 days.

(21) Appl. No.: 16/818,377

(22) Filed: Mar. 13, 2020

(65) Prior Publication Data
US 2020/0307917 A1    Oct. 1, 2020

(30) Foreign Application Priority Data
Mar. 28, 2019   (EP) .................................... 19165800

(51) Int. Cl.
| B65G 21/16 | (2006.01) |
| B65G 39/12 | (2006.01) |
| B65G 43/08 | (2006.01) |

(52) U.S. Cl.
CPC ............ *B65G 21/16* (2013.01); *B65G 39/12* (2013.01); *B65G 43/08* (2013.01); *B65G 2812/02* (2013.01)

(58) Field of Classification Search
None
See application file for complete search history.

(56) References Cited

U.S. PATENT DOCUMENTS

| 3,147,852 | A | | 9/1964 | Hanson, Jr. | |
|---|---|---|---|---|---|
| 5,007,528 | A | * | 4/1991 | Hideharu | B65G 15/60 198/823 |
| 7,750,253 | B2 | * | 7/2010 | Wineland | G01G 11/04 177/16 |
| 8,063,321 | B2 | * | 11/2011 | Wineland | G01G 11/00 177/126 |
| 8,985,317 | B2 | * | 3/2015 | Martin | B65G 15/60 198/828 |
| 9,139,367 | B2 | * | 9/2015 | Swinderman | B65G 15/08 |
| 9,469,480 | B2 | * | 10/2016 | Gibbs | B65G 15/08 |

(Continued)

FOREIGN PATENT DOCUMENTS

| EP | 3409620 | 12/2018 |
|---|---|---|

OTHER PUBLICATIONS

European Search Report for European Application No. 19165800, dated Nov. 12, 2019, 5 pages.

*Primary Examiner* — Kavel Singh
(74) *Attorney, Agent, or Firm* — Ganz Pollard, LLC

(57) ABSTRACT

Support station for supporting a conveyor belt of a belt conveyor system, with several support rollers rotatably held on a support frame, and an anti-trap guard with several anti-trap guard sections, wherein in each case an anti-trap guard section is arranged adjacent to a support roller and at a distance from the conveyor belt, wherein each anti-trap guard section is held on a support, wherein in each case a flexible intermediate section is arranged between ends of two adjacent anti-trap guard sections and connects these flexibly with each other, wherein at least one of the supports is adjustable and thereby the distance of the anti-trap guard section that is held on it from the conveyor belt and a distance of at least one intermediate section from the conveyor belt can be set, as well as a method for adjustment.

18 Claims, 2 Drawing Sheets

(56) References Cited

U.S. PATENT DOCUMENTS

| | | | | |
|---|---|---|---|---|
| 9,856,088 B1* | 1/2018 | Riggs | ............... | B65G 41/002 |
| 9,859,088 B2* | 1/2018 | Shaikh | ............... | C23C 16/505 |
| 10,377,571 B2* | 8/2019 | Grimm | ............... | B65G 21/00 |
| 2017/0320675 A1* | 11/2017 | Brunone | ............... | B65G 23/44 |

* cited by examiner

ADJUSTABLE ANTI-TRAP GUARD FOR BELT CONVEYORS

BACKGROUND

The present invention relates to a support station for supporting a conveyor belt of a belt conveyor system, such a belt conveyor system with at least one such support station, as well as a method for setting a distance between a conveyor belt and an anti-trap guard device.

In the case of belt conveyor systems, entanglement hazard points between the running belt and the rotating rollers must be avoided or adjusted as harmlessly as possible, since such entanglement hazard areas are a source of danger, in particular for employees who are present in the area of the conveyor belt, carry out work there, and whose hands or clothing can get into the entanglement hazard area.

From EP 1 847 486 B1, we know of a support station for a conveyor with several guide rollers and support rollers for a conveyor belt, wherein an anti-trap guard is provided which includes a protective profile rail that extends continuously along the length of at least two support rollers.

The known anti-trap guard is composed of several anti-trap guard sections, which in each case run parallel to a support roller in their longitudinal direction. At transition areas between adjacent support rollers, i.e. the transition points between the individual anti-trap guard sections, the anti-trap guard sections are welded together. At these points, the anti-trap guard forms sharp-edged and inflexible angles. The conveyor belt on the other hand often has, at these points, a rounding with a radius whose size depends on the loading of the conveyor belt, the pre-tensioning of the conveyor belt, the speed of conveyance, the age of the conveyor belt and other factors.

The rigid angles between the anti-trap guard sections cannot be adapted to the changing radii of the conveyor belt. Thus, at these points, the conveyor belt can have an undesirably large distance from the anti-trap guard.

The object of the present invention is to overcome the problems described above. In particular, a support station is to be provided which ensures a specified small distance between conveyor belt and the anti-trap guard.

SUMMARY

According to the invention, this object is achieved by a support station, as disclosed herein. Advantageous embodiments are described in the dependent claims.

The support station according to the invention offers the advantage that the distances between the anti-trap guard and the conveyor belt can be reduced in an entanglement hazard area that lies in a transitional area between adjacent support rollers. This is mainly due to the fact that the support station is flexibly adjustable. If, for example, the shape of the conveyor belt changes due to a change in loading, a change in pre-tensioning of the conveyor belt, aging of the belt conveyor system or the conveyor belt, or a change in speed of transportation, this can be compensated by adjusting the anti-trap guard. For this purpose, the position of one or more anti-trap guard sections and/or intermediate sections can be changed. A non-adjustable support can be formed in whole or in part by a bearing support of a support roller or by the support frame.

As indicated above, a particularly critical position of the entanglement hazard area is the transitional area between two support rollers. At such places, the shape of the conveyor belt changes particularly markedly due to the aforementioned influences, since at that point it is not resting on any support roller. The rollers are at an angle to each other, so that the anti-trap guard is also angled in these sections. In the case of familiar support stations, two straight sections of the anti-trap guard abut at this point. The shape of the anti-trap guard thus does not sufficiently reflect the radius of the conveyor belt at this point. This can create a relatively large gap between conveyor belt and anti-trap guard.

The support station according to the invention can cover these critical transition points between two support rollers particularly well, since at these places, flexible intermediate sections are provided.

The flexible intermediate sections are elastic, i.e. they can be deformed to a certain extent. In particular, they can be more elastic than the adjacent anti-trap guard sections, which are each arranged adjacent to a support roller. For preference, two anti-trap guard sections, which are connected to one another at their ends by means of a flexible intermediate section, can be moved relative to one another due to the flexibility of the flexible intermediate section.

Accordingly, the flexible intermediate section can form a radius that essentially corresponds to the radius of the conveyor belt at this point. Since the anti-trap guard sections can be moved relative to one other, in this case the radius of the flexible intermediate section is also adjustable. Thus, the shape of the flexible intermediate section can be flexibly adapted to the shape of the conveyor belt if it changes. Thus, the distance between the flexible intermediate section and the conveyor belt can be minimised or set to a level that can be specified.

The support station can have two, three, four, five or a larger number of support rollers. The anti-trap guard can have one anti-trap guard section per support roller in each case. A middle anti-trap guard section can be firmly held on a fixed support, while the outer two anti-trap guard sections can be borne on the respective support so that they can be moved relative to the support, wherein the respective support is or can be adjustable too.

At least one anti-trap guard section can have its position set by adjusting the support on which it is borne. Several, preferably all, anti-trap guard sections can be set by adjusting the respective supports. In the case of an embodiment with three support rollers and three anti-trap guard sections, the outer two anti-trap guard sections can be adjustable by means of their supports.

The rotational axes of the support rollers of a support station preferably have an angle to each other, which can be for example between 5° and 45°, so that the conveyor belt is trough-shaped in terms of cross section, and a middle support roller is arranged horizontally.

A support with which a support roller is supported can correspond in whole or in part to a fixed or non-adjustable support of an anti-trap guard section.

In an unladen state or with minimal loading, it can happen that the conveyor belt only rests on support rollers along a line of contact that can be significantly shorter than an axial length of the support roller. If the loading on the conveyor belt increases, the conveyor belt is pressed more strongly against the support rollers and the contact length between the support rollers and the conveyor belt is increased, so that the cross-sectional shape of the conveyor belt changes. Preferably, all rotational axes of the support rollers lie in a plane that lies orthogonally to a direction of conveyance of the conveyor belt. The anti-trap guard sections are arranged below the conveyor belt and, when seen in the direction of conveyance, they are located in front of or upstream of a support roller. Each anti-trap guard section can be arranged along a line parallel to the rotational axis of the corresponding support roller, centrally before the support roller. Here, along the rotational axis of the support roller, the anti-trap guard section can cover at least a length of 50%, 75%, 80% or 90% of a length of the support roller. A flexible intermediate section, following on in each case at the ends of two anti-trap guard sections, covers a transitional area between two support rollers that can be at least 5%, 10%, 25% or 50% of a length of the respective support roller.

The rollers can be passively rotating rollers which are driven only by the movement of the conveyor belt, or actively rotating rollers that are provided with or coupled to a drive mechanism and drive the conveyor belt.

The position of the bearing of at least one protective section can be adjustable by adjusting the support of the anti-trap guard section in a vertical direction or in a direction parallel to a rotational axis of an adjacent support roller. At least one support can be movable or adjustable in the direction of conveyance of the belt conveyor system, i.e. in the direction of travel of the conveyor belt.

The supports can be fixed to a base or fixed to a frame on which the support rollers too are held.

The shape of an intermediate section can be changed by changing the position of adjacent anti-trap guard sections relative to one other. If the relative position of two adjacent anti-trap guard sections to each other changes, an anti-trap guard section, which is borne on a support such that it can be moved in the longitudinal direction via a bearing, is shifted along a direction of adjustment, since it is connected via the flexible intermediate section to a neighbouring anti-trap guard section. This changes the slope and radius of curvature of the intermediate section that connects the two anti-trap guard sections to one another.

At least one support can be connected via a bearing to the anti-trap guard section held on it, wherein the bearing allows a limited longitudinal movement of the anti-trap guard section relative to the support parallel to the rotational axis of the support roller that is adjacent to the anti-trap guard section, or in other words allows a limited longitudinal movement of the anti-trap guard section relative to the support in a direction that runs parallel to the rotational axis of the support roller that is situated adjacent to the anti-trap guard section.

At least one of the anti-trap guard sections can be fixed, i.e. immobile, on its support. If the support station has three anti-trap guard sections, preferably the middle guard section is fixed, and the outer anti-trap guard sections are movable via a bearing. The bearing can be a plain bearing or roller bearing.

An important feature of the anti-trap guard of the support station is that the actual belt shape or cross-sectional shape of the conveyor belt that adjusts during operation is reflected by the anti-trap guard, wherein this is brought closer to the conveyor belt, leaving a small distance, e.g. not more than 1 mm, 2 mm, 5 mm or 10 mm, expediently over the entire width of the conveyor belt.

The support station can furthermore have a control device for adjusting at least one of the anti-trap guard sections.

The support station can include a sensor. The sensor can be an optical sensor, for example a camera or a laser-based sensor.

The sensor can be used to determine a distance between the conveyor belt and at least part of the anti-trap guard, in particular at least one flexible intermediate section. The sensor can be connected to the control device and the control device can adjust the position of the anti-trap guard section based on the distance that has been determined.

The control device can have a memory in which reference positions of an anti-trap section can be stored. The reference positions can be determined by the control device on the basis of a detected actual distance between the conveyor belt and at least part of the anti-trap guard, or on the basis of a loading state or a conveying speed of the belt conveyor system.

The rotational axes of the support station's support rollers can have angles to each other that are adjustable. Here, angles of the anti-trap guard sections of the anti-trap guard can be adjustable relative to each other, to prevent contact with the conveyor belt or to prevent too great a distance from the conveyor belt in the case of a change of angle of the support rollers. The at least one anti-trap guard section can be pivoted, or a support of an anti-trap guard section can be fixed to a mount of the support roller, so that the angle of the anti-trap guard automatically changes when the angle of the support roller is adjusted.

The invention also relates to a belt conveyor according to claim 13 and to a method according to claim 15.

A unitary control device, as described above, can be used for the entire belt conveyor system. Accordingly, several support stations along the belt conveyor system can be controlled via the control device. In a support station, several flexible intermediate sections, or each one, or only one flexible intermediate section, can be equipped with a sensor as described above. In addition, several anti-trap guard sections, or only one, or each anti-trap guard section, can be equipped with a sensor as described above. In a belt conveyor system, a support station or several support stations can be equipped with a sensor as described above.

If not all support stations and/or anti-trap guard sections and/or flexible intermediate sections are equipped with sensors, the support stations, anti-trap guard sections and/or flexible intermediate sections can be controlled on the basis of the distance(s) detected at the support station(s), anti-trap guard section(s) and/or flexible intermediate section(s) by means of at least one sensor. The sensors can be integrated into a flexible intermediate section, a support and/or an anti-trap guard section, or attached to it.

The support station can be automated by means of the control device in order to adjust the anti-trap guard automatically at a number of places at a predetermined distance from the conveyor belt. By means of a number of sensors, such as for example cameras or distance sensors, conveniently integrated directly into the anti-trap guard, the distances can be detected, and the adjustable supports can be adjusted via the control device in such a way that the specified distances are reached. By means of at least one adjustable support, the anti-trap guard section held in it is adjusted in a direction transverse to and/or parallel to a rotational axis of the adjacent support roller. In addition, on at least one support that is provided with a bearing, the anti-trap guard section held in it can be shifted parallel to the rotational axis of the adjacent support roller, whereby a flexible intermediate section between two adjacent anti-trap guard sections is deformed and its radius of curvature is changed and in particular is adapted to the radius of curvature of the conveyor belt or is changed in this direction, whereby also the distance of the intermediate section from the conveyor belt is changed.

A number of support stations, each provided with an anti-trap guard, can be interlinked, so that one or more distance sensors at a support station can adjust the protective guard elements at several support stations.

In the following, an embodiment of a support station according to the invention, which is usually present in multiple numbers in a belt conveyor system, is described in more detail on the basis of a drawing.

DETAILED DESCRIPTION

Figure 1:
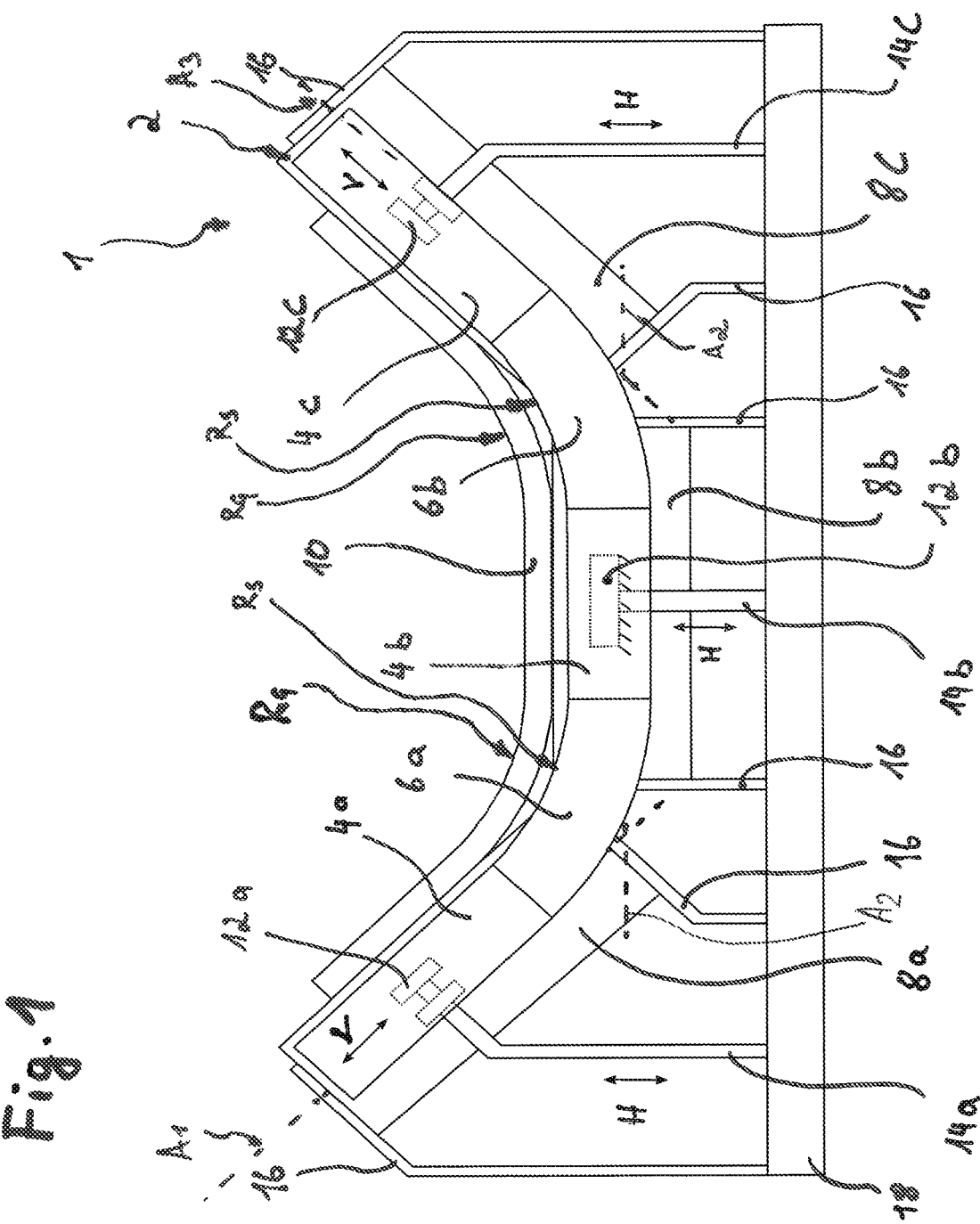
FIG. 1 shows a frontal view of a support station according to the invention.

FIG. 1 shows a support station 1 according to the invention with an anti-trap guard 2, which consists of three anti-trap guard sections 4a, 4b 4c and two intermediate sections 6a, 6b arranged between two adjacent anti-trap guard sections 4a, 4b, 4c in each case. In the embodiment shown here, the anti-trap guard 2 is arranged in front of three support rollers 8a, 8b, 8c and below a conveyor belt 10 which is carried by the three support rollers 8a, 8b, 8c. Thus, an entanglement hazard area between the conveyor belt 10 and the support rollers 8a, 8b and 8c is covered. Such anti-trap guard is important, because otherwise objects, clothing or body parts that come into contact with the conveyor belt and/or the support roller could be pulled in the direction of the support station, i.e. between the support roller and the conveyor belt.

The anti-trap guard 2 is supported by three supports 14a, 14b and 14c. For this purpose, the supports 14a, 14b, 14c have bearings 12a, 12b, 12c, on which the anti-trap guard sections 4a, 4b, 4c are held. The support rollers 8a, 8b 8c are supported by bearing supports 16.

The supports 14a, 14b, 14c, 16 are fixed to a support frame 18 of the belt conveyor system.

The support rollers 8a, 8b, 8c are rotatably borne on the bearing supports 16, wherein rotational axes A1, A2, A3 of the support rollers 8a, 8b, 8c are arranged angled to each other and the conveyor belt 10 attains a trough-like shape. In the transitional area between two support rollers 8a, 8b, 8c, a curvature $R_G$ of the conveyor belt with a radius is achieved, depending on the loading, pre-tensioning or other influencing factors. With respect to the anti-trap guard, this area is covered by the intermediate sections 6a, 6b, which reproduce the radius of the curvature $R_G$ of the conveyor belt 10. For this purpose, the radii of curvature $R_S$ of the intermediate sections 6a, 6b are adjustable.

The supports 14a, 14b and 14c, to which the anti-trap guard sections 4a, 4b, 4c are fixed, can be adjusted in the vertical direction H, i.e. in respect of their height. For this purpose, the supports 14a, 14b, 14c can be designed to be telescopic. Thus, by adjusting the supports 14a, 14b and 14c, the position of the bearings 12a, 12b and 12c is changed. In the embodiment shown, the position of the bearings 12a, 12b, 12c is thereby changed in the vertical direction. The position of the bearings 12a, 12b, 12c can alternatively or additionally be changed in a horizontal direction.

The two outer anti-trap guard sections 4a, 4c can be additionally moved along a second direction of adjustment V running parallel to the rotational axis of the respective adjacent support roller 12a, 12c, relative to the two outer supports 14a, 14c.

Also, the bearing 12b of the middle anti-trap guard section 4b could allow such a relative movement between the anti-trap guard section 4b and the support 14b. In the illustrated example, however, the bearing 12b is a fixed bearing, so that no relative movement between the anti-trap guard section 4b and the support 14b can take place.

The bearings 12a, 12c, on which the two outer anti-trap guard sections 4a and 4c are borne, can have a drive. In this case, the anti-trap guard sections 4a, 4c can be moved along the direction of adjustment V independently of the other position or height position of the bearing 12a, 12c. The direction of adjustment V runs parallel to the rotational axis of the adjacent support roller and also parallel to the longitudinal extension of the anti-trap guard sections 4a and 4c, and is predetermined by the bearing 12a, 12c. If the anti-trap guard sections 4a and 4c are moved outwards, in other words away from the middle anti-trap guard section 4b, the intermediate sections 6a and 6b are drawn lengthwise, so that the radius of curvature $R_S$ of the intermediate sections 6a and 6b increases. If the anti-trap guard sections 4a and 4c are moved inwards, in other words in the direction of the middle anti-trap guard section 4b, the intermediate sections 6a and 6b are pushed together and the radius of curvature $R_S$ of the intermediate sections 6a and 6b decreases. The height of all three supports 14a, 14b and 14c is individually adjustable regardless of that. Thus, the radius of curvature $R_S$ of the intermediate sections 6a and 6b can be adapted to the radius of curvature $R_G$ of the conveyor belt 10 at the transition between two adjacent support rollers 8a, 8b and 8c, and the anti-trap guard 2 can be positioned at a specified distance from the conveyor belt 10.

Alternatively, individual bearings, in particular the bearings 12a and 12c, can be equipped without their own drive, but allow a relative movement of the respective anti-trap guard section in the direction of adjustment V. That is, the two outer anti-trap guard sections 4a and 4c are displaced passively or by adjusting the supports 14a, 14b, 14c relative to each other. If, for example, the middle support 14b is moved vertically upwards relative to the outer supports 14a, 14c, the two outer anti-trap guard sections 4a and 4c can be moved outwards along the direction of adjustment V by the flexible intermediate sections 6a and 6b.

Since the two outer adjustment sections 4a and 4c are moved in the bearings 12a, 12c on an oblique, guided path (in the direction of adjustment V) and the middle anti-trap guard section 4b is moved only in the vertical direction, the distance between the anti-trap guard sections 4a, 4b, 4c decreases in the vertical direction. This changes the slope and radius of curvature of intermediate sections 6a and 6b. In the example described here, the slope of intermediate sections 6a and 6b decreases and the radius of curvature increases. A comparable effect would be caused by a lowering of the supports 14a and 14c of the two outer adjustment sections 4a and 4c. A lowering of the middle adjustment section 4b relative to the two outer adjustment sections 4a, 4c would have the opposite effect. The radius of curvature and the slope of the intermediate sections 6a and 6b can be set by the relative position of bearings 12a, 12b, 12c of the anti-trap guard sections 4a, 4b, 4c to each other, while the distance of the anti-trap guard 2 to the conveyor belt 10 can be set via the absolute height or the absolute position of the bearings.

If the two outer anti-trap guard sections 4a and 4c are displaced in the direction of adjustment V not actively but passively (i.e. without a drive), the bearings 12a and 12c can for example be designed as plain bearings or roller bearings (e.g. ball or cone roller bearings).

Due to the fixed mounting of the middle bearing 12b, the positions of the anti-trap guard sections 4a, 4b, 4c are clearly defined by the positions of bearings 12a, 12b, 12c, even in the case of passive adjustment of the two outer anti-trap guard sections 4a and 4c.

Figure 2:
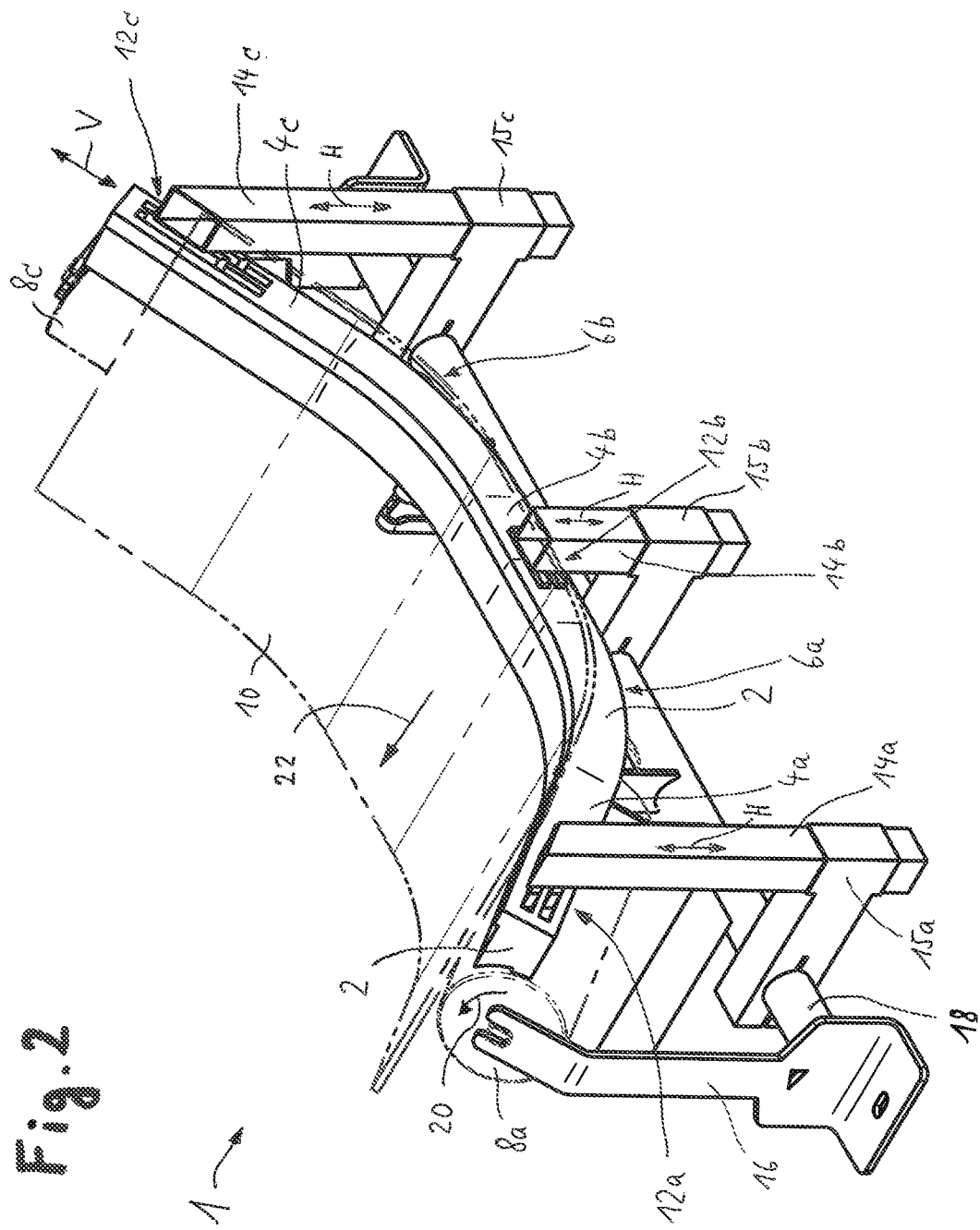
FIG. 2 shows a perspective view of a support station according to the invention.

FIG. 2 shows a perspective view of a similar embodiment of a support station, wherein the arrangement of the conveyor belt 10 with direction of conveyance 22, support rollers 8a, 8c (middle support roller not shown) and direction of rotation 20 as well as anti-trap guard 2 with anti-trap guard sections 4a, 4b, 4c, intermediate sections 6a, 6b, bearings 12a, 12b, 12c and supports 14a, 14b, 14c as well as bearing supports 16 corresponds to the embodiment according to FIG. 1. FIG. 2 shows by way of example how the supports 14a, 14b, 14c can be accommodated and vertically adjusted in mounts 15a, 15b, 15c, wherein the middle support 14b can be held firmly in the mount 15b.

FIG. 2 furthermore shows an example embodiment of the bearings 12a, 12b, 12c, wherein the lateral anti-trap guard sections 4a, 4b, 4c are held on bearings 12a, 12c on the supports 14a, 14b, such that they can be moved in a direction of adjustment V, and the respective direction of adjustment V runs parallel to the rotational axis of the respective adjacent support roller. The bearing 12b of the middle anti-trap guard section 4b on the middle support 14b can be rigid, i.e. the anti-trap guard section 4b can be firmly connected to the support 14b, and this can be firmly connected to the support frame 18.

The support frame 18 is symbolised by a horizontal tube, or can include this, wherein the mounts 15a, 15b, 15c for the supports are fixed to the support frame 18.

The invention claimed is:

1. A support station for supporting a conveyor belt of a belt conveyor system, comprising several support rollers rotatably held on a support frame, and an anti-trap guard with several anti-trap guard sections, wherein in each case an anti-trap guard section is adjacent to a support roller and at a distance from the conveyor belt,
   wherein each anti-trap guard section is held on a support,
   wherein in each case a flexible intermediate section is arranged between ends of two adjacent anti-trap guard sections and connects these flexibly with each other, and
   wherein at least one of the supports is adjustable and thereby the distance of the anti-trap guard section that is held on it from the conveyor belt and a distance of at least one intermediate section from the conveyor belt can be set.

2. The support station according to claim 1, wherein at least one of the anti-trap guard sections is rigid or flexible, wherein the anti-trap guard overall can be formed in a single piece.

3. The support station according to claim 1, wherein by means of at least one adjustable support the anti-trap guard section that is held on it is adjustable in a direction transverse and/or parallel to a rotational axis of the adjacent support roller.

4. The support station according to claim 1, wherein at least one adjustable support is adjustable in a direction transverse and/or parallel to a rotational axis of the support roller which is located adjacent to the anti-trap guard section held by the support.

5. The support station according to claim 1, wherein at least one support is firmly connected to the anti-trap guard section that is held on it.

6. The support station according to claim 1, wherein in that at least one support is connected via a bearing to the anti-trap guard section that is held on it, wherein the bearing allows a limited longitudinal movement of the anti-trap guard section relative to the support in a direction of adjustment that runs parallel to the rotational axis of the support roller which is adjacent to the anti-trap guard section.

7. The support station according to claim 6, wherein at least one bearing has a first adjustment drive for adjusting the anti-trap guard section held on it in the direction of adjustment.

8. The support station of claim 1, wherein several or all supports are adjustable jointly and parallel to one another by means of a second adjustment drive or by several second adjustment drives, in particular a second adjustment drive per support, independently of each other or group-wise in predetermined groups.

9. The support station according to claim 1, further comprising, a control device for adjusting the position or for setting a distance from the conveyor belt of at least one of the anti-trap guard sections and at least one of the intermediate sections, wherein the control device is connected to at least one first adjustment drive and/or to at least one second adjustment drive of at least one of the supports and/or at least one bearing.

10. The support station according to claim 9, further comprising a sensor for determining a distance between the conveyor belt and an anti-trap guard section and/or a flexible intermediate section, wherein the sensor is connected to the control device, and the control device is set up to control at least one first adjustment drive and/or at least one second adjustment drive on the basis of the distance that has been determined, to set a specified distance between an anti-trap guard section or an intermediate section and the conveyor belt.

11. The support station according to claim 10, wherein at least one sensor is integrated into an anti-trap guard section and/or an intermediate section.

12. The support station according to claim 1 further comprising, an energy converter which generates electrical energy from the rotation of one of the support rollers for at least one first and/or second adjustment drive and/or a sensor.

13. The support station of claim 1 wherein the several support rollers rotatably held on a support frame extend along a width of the conveyor to support the belt.

14. The support station of claim 13 wherein the several anti-trap guard sections each extend along the width of a roller, and wherein in each case the anti-trap guard section is adjacent to a support roller along a width of the roller in a gap between the support roller.

15. The support station of claim 1 wherein the several anti-trap guard sections each extend along the width of a roller, and wherein in each case the anti-trap guard section is adjacent to a support roller along a width of the roller in a gap between the support roller.

16. A belt conveyor system, comprising:
   a conveyor belt and at least one support station supporting the conveyor belt, the support station comprising:
      several support rollers rotatably held on a support frame, and an anti-trap guard with several anti-trap guard sections;
      wherein in each case an anti-trap guard section is adjacent to a support roller and at a distance from the conveyor belt;
      wherein each anti-trap guard section is held on a support, wherein in each case a flexible intermediate section is arranged between ends of two adjacent anti-trap guard sections and connects these flexibly with each other;

and wherein at least one of the supports is adjustable and thereby the distance of the anti-trap guard section that is held on it from the conveyor belt and a distance of at least one intermediate section from the conveyor belt can be set.

17. A belt conveyor according to claim 16, wherein several support stations are interlinked, wherein distances between the conveyor belt and anti-trap guard sections and/or intermediate sections of several support stations can be set on the basis of a distance, determined at a single support station, between the conveyor belt and an anti-trap guard section and/or an intermediate section of this support station.

18. A method for setting a distance between a conveyor belt and an anti-trap guard at a support station supporting a conveyor belt of a belt conveyor system, the support station comprising:

several support rollers rotatably held on a support frame, and an anti-trap guard with several anti-trap guard sections, wherein in each case an anti-trap guard section is adjacent to a support roller and at a distance from the conveyor belt, wherein each anti-trap guard section is held on a support, wherein in each case a flexible intermediate section is arranged between ends of two adjacent anti-trap guard sections and connects these flexibly with each other, and wherein at least one of the supports is adjustable and thereby the distance of the anti-trap guard section that is held on it from the conveyor belt and a distance of at least one intermediate section from the conveyor belt can be set, wherein the method steps comprise:

(a) detecting a distance between an anti-trap guard section and/or an intermediate section of the anti-trap guard and the conveyor belt, (b) comparing the recorded distance with a specified distance, and (c) adjusting at least one support and changing the distance of at least one anti-trap guard section and/or an intermediate section from the conveyor belt towards the specified distance; and/or displacing an anti-trap guard section in a direction of adjustment relative to a support.

* * * * *